No. 793,843. PATENTED JULY 4, 1905.
L. LIBBMAN.
MIXING VESSEL.
APPLICATION FILED DEC. 22, 1904.
FIG_1_
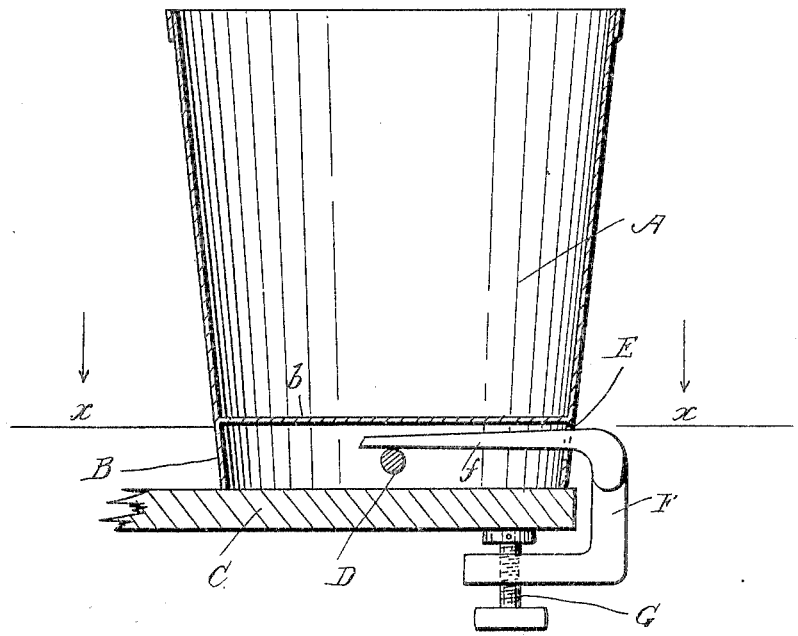
FIG_2_
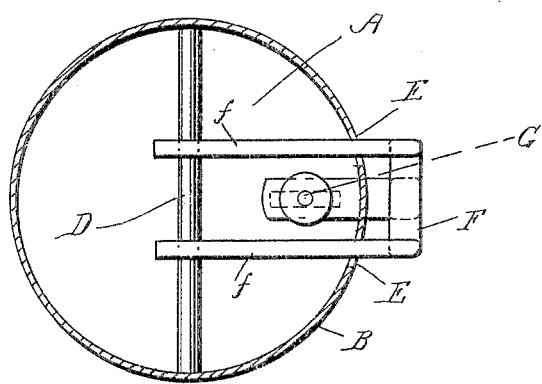
WITNESSES:
INVENTOR
Louis Libbman.
BY
Attorney No. 793,843.                                                                                      Patented July 4, 1905.

UNITED STATES PATENT OFFICE.

LOUIS LIBBMAN, OF EVERETT, MASSACHUSETTS.

MIXING VESSEL.

SPECIFICATION forming part of Letters Patent No. 793,843, dated July 4, 1905.

Application filed December 22, 1904. Serial No. 237,930.

*To all whom it may concern:*

Be it known that I, LOUIS LIBBMAN, a citizen of the United States, residing at Everett, in the county of Middlesex and State of Massachusetts, have invented certain new and useful Improvements in Mixing Vessels; and I do hereby declare the following to be a full, clear, and exact description of the invention, such as will enable others skilled in the art to which it appertains to make and use the same.

This invention relates to vessels in which various substances or liquids—such as dough, ice-cream, &c.—are mixed, agitated, or stirred and which require to be held stationary; and it consists in the novel construction and combination of the parts hereinafter fully described and claimed.

In the drawings, Figure 1 is a vertical section through the vessel. Fig. 2 is a sectional plan view taken on the line $x\ x$ in Fig. 1.

A is a vessel of any approved form, such as a pail. The sides B of this vessel extend downwardly below its bottom $b$ and rest on a support, such as a table-top C.

D is a bar which extends between the sides of the vessel across its middle part and below its bottom $b$.

E is a hole or any opening or space in the side of the vessel, and more than one hole or opening can be provided, if desired.

F is a clamp provided with an arm or arms $f$, which project through the hole or holes E and which engage with the bar D. The clamp extends below the table-top or other similar stationary support, and G is the clamping-screw. The vessel A is securely clamped to the table, so that its contents can be mixed or agitated to the best advantage.

What I claim is—

1. The combination, with a vessel provided with sides which extend below its bottom, of a cross-bar extending between its sides under its bottom, and a clamp for engaging the said cross-bar and holding the vessel in position.

2. The combination, with a vessel provided with sides which extend below its bottom, and having holes in the lower parts of its sides, of a cross-bar extending between the said sides under the bottom of the vessel, and a clamp provided with two arms which project through the said holes and engage with the said cross-bar.

In testimony whereof I have affixed my signature in the presence of two witnesses.

LOUIS LIBBMAN.

Witnesses:
  ALICE J. MURRAY,
  FREDERICK K. DAGGETT.